United States Patent
Gehlot et al.

(10) Patent No.: US 6,830,213 B1
(45) Date of Patent: Dec. 14, 2004

(54) WIRELESS GUIDANCE SYSTEM

(75) Inventors: Narayan L. Gehlot, Sayreville, NJ (US); Victor B. Lawrence, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/442,791

(22) Filed: May 21, 2003

(51) Int. Cl.$^7$ ................................................ F41G 7/00
(52) U.S. Cl. ................ 244/3.19; 244/3.15; 342/450; 342/451; 342/463; 342/464; 455/422.1; 455/456.1
(58) Field of Search .................. 701/201, 206–212, 701/224–226, 300, 302; 342/357.01–357.17, 450–465; 455/403, 404.1, 404.2, 414.2, 422.1, 446, 456.1–456.6, 457; 244/3.1–3.3

(56) References Cited

U.S. PATENT DOCUMENTS

| | | | | |
|---|---|---|---|---|
| 3,706,096 A | * | 12/1972 | Hammack | 342/451 |
| 3,953,856 A | * | 4/1976 | Hammack | 342/458 |
| 3,996,590 A | * | 12/1976 | Hammack | 342/465 |
| 5,327,144 A | * | 7/1994 | Stilp et al. | 342/457 |
| 5,344,105 A | * | 9/1994 | Youhanaie | 244/3.14 |
| 5,512,908 A | * | 4/1996 | Herrick | 342/451 |
| 5,554,994 A | * | 9/1996 | Schneider | 244/3.19 |
| 5,895,436 A | * | 4/1999 | Savoie et al. | 342/457 |
| 6,198,941 B1 | | 3/2001 | Aho et al. | |
| 6,212,405 B1 | | 4/2001 | Jiang et al. | |
| 6,300,898 B1 | | 10/2001 | Schneider et al. | |
| 6,573,486 B1 | * | 6/2003 | Ratkovic et al. | 244/3.2 |

* cited by examiner

*Primary Examiner*—Bernarr E. Gregory

(57) ABSTRACT

A wireless means of guidance for a device in accordance with the present invention includes receiving signals from at least one wireless base station indicating at least a respective position thereof, determining the current position of the device using at least the information contained in the received signals, calculating a vector between the determined current position and a predetermined desired destination for the device, and making trajectory corrections to the device's current trajectory so as to guide the device to the desired destination. In addition to the information contained in the received signals, the guidance system may also use stored information regarding parameters, such as the location, communication protocols and operating frequencies of the wireless base stations, as well as previous position information, for determining a current position for the device.

24 Claims, 8 Drawing Sheets

US 6,830,213 B1

WIRELESS GUIDANCE SYSTEM

FIELD OF THE INVENTION

This invention relates to the field of guidance systems and, more specifically, to wireless guidance systems.

BACKGROUND OF THE INVENTION

Guidance systems are used in the location and positioning of devices. Current guidance systems, however can be very expensive. In addition, guidance systems, which rely on satellites that are positioned at great distances, may result in inaccurate positioning information due to weakened or blocked signals. One such system is the Global Positioning System, which is a network of satellites that transmits information signals that when received and decoded, allows a receiver to know its position within a coverage area. Use of the GPS enables self-guided weapons to find targets.

Unfortunately, the GPS signals, which typically use 10 watt signals from satellites in an 11,000 nautical mile orbit, are easy to jam with low power, low cost jammers scattered around a target area. Assuming a large number jammers are used to defend a high value target, one by one destruction of the jammers would have a low payoff. This is because even if only a few jammers remain operational, they can still effectively jam the guidance systems of incoming weapons.

Accordingly, one solution for providing an anti-jamming countermeasure for a GPS guided device is to equip the GPS guided device with a number of antennas, which point a null in the antenna radiation pattern at the source of the jamming signal. Though somewhat effective, this approach can be expensive since the number of jammers that can be nullified is one less than the number of antenna elements. As such, the effectiveness of this approach is limited when a large number of jammers are being used.

SUMMARY OF THE INVENTION

The present invention overcomes the limitations of the prior art by providing a wireless means of guidance for devices by receiving signals from surrounding wireless base stations, which are ordinarily used for wireless voice and data communications, (e.g., cellular-type service) and determining a current position of a device using at least the information from the received signals.

A method for wireless guidance for a device in accordance with the present invention includes receiving signals from at least one wireless base station indicating at least a respective position thereof, determining the current position of the device using at least the information contained in the received signals, calculating a vector between the determined current position and a predetermined desired destination for the device, and making trajectory corrections, using the calculated vector, to the device's current trajectory so as to guide the device to the desired destination. In addition to the information contained in the received signals, the guidance system may also use stored information, such as indications of the location, communication protocols and operating frequencies of the wireless base stations, as well as previous position information from an alternate guidance system, for determining a current position for the device. The method wireless guidance may further include communicating with at least one wireless base station to initiate the transmission of information from the at least one wireless base station. Such communication may be for the purpose of activating an alternate source of power for the contacted wireless base station in the event of an outage of primary power source power for the wireless base station.

Advantageously, the present invention may be employed as a backup guidance system for a primary guidance system, in that it may be adapted to determine a current position for the device in the event of a primary guidance system failure. For example, in a device employing a GPS based guidance system as the primary guidance system, the wireless means of guidance of the present invention would be used to provide further guidance for the device in response to a GPS failure such as GPS blackout, GPS blockage, or poor GPS signal to noise ratio.

BRIEF DESCRIPTION OF THE DRAWINGS

In the drawings.

To facilitate understanding, identical reference numerals have been used, where possible, to designate identical elements that are common to the figures.

DETAILED DESCRIPTION OF THE INVENTION

The present invention advantageously provides a method and system for providing a wireless means of guidance for devices. Although various embodiments of the present invention are being described herein within the context of the guidance of a missile, it will be appreciated by those skilled in the relevant art, informed by the teachings of the present invention, that the concepts of the present invention may be applied to the guidance of other devices.

Figure 1:
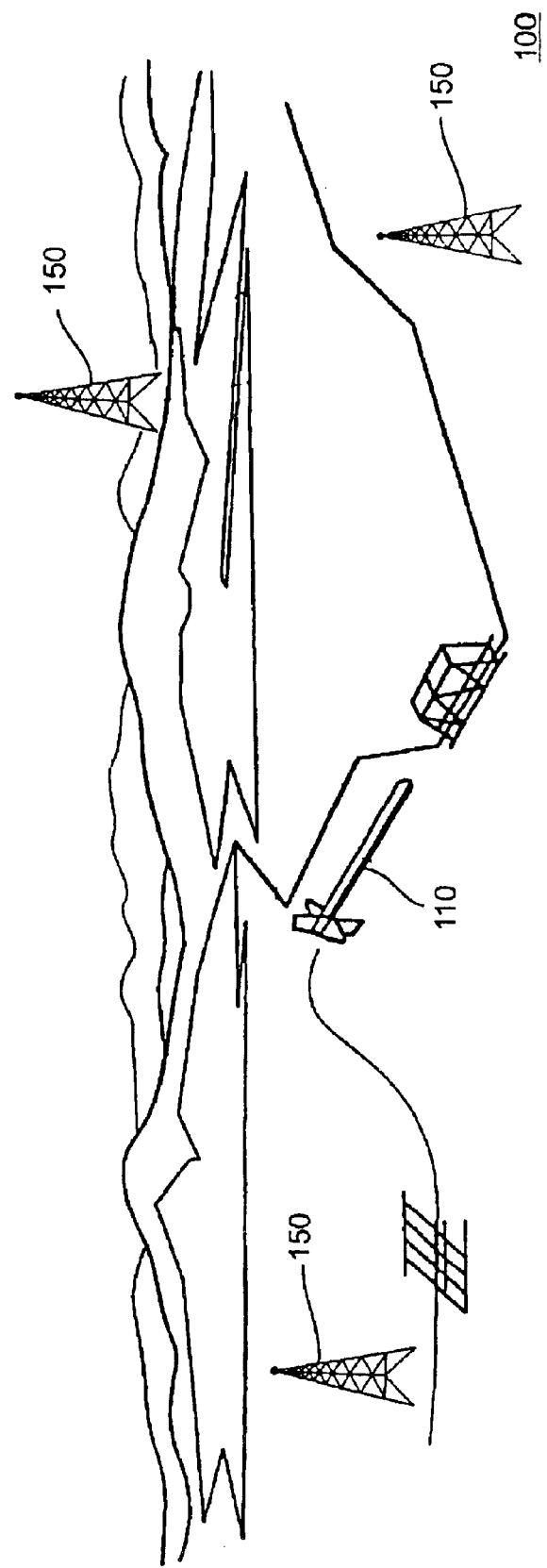
FIG. 1 depicts a high level block diagram of an embodiment of a wireless base station guidance system in accordance with the present invention in an operational environment.

FIG. 1 depicts a high level block diagram of an embodiment of a wireless base station guidance system in accordance with the present invention in an operational environment 100. The wireless base station guidance system (WBSGS) of FIG. 1 is depicted within the operation of a WBSGS-guided missile 110, a target 120, and a number of wireless base stations 150. The WBSGS of the present invention is adapted to receive information from wireless base stations in the proximity of its location. For example in FIG. 1, the WBSGS is adapted to receive information from the wireless base stations 150. The information received from the wireless base stations 150 may include such information as the location of the wireless base station, the direction of the received signal, the time the signal traveled to reach the receiver, and the like. In addition, the wireless base stations 150 may transmit using any carrier frequency, such as CDMA and GSM, and still be received by the WBSGS of the present invention. That is, the WBSGS of the present invention is pre-configured to receive the carrier frequencies of any wireless base stations in an area of interest.

Information regarding the wireless base stations, such as the actual location, communication protocols and operating frequencies of permanent wireless base stations, is available in advance from the individual base station installers world wide (i.e., the ITU data base of mobile service providers (MSPs) such as Lucent, Ericsson, Nortel, Nokia, and Motorola, just to name a few). This information is stored in a memory of the WBSGS of the present invention.

In addition to the information received from the permanent base stations, the WBSGD of the present invention may receive information from temporary wireless base stations having known locations, frequencies and communications protocols, set up, for example, by military forces in the case of an emergency or on a battleground. Temporary wireless base stations may also be set up for many other applications extending beyond, military applications as well. The information regarding the temporary wireless base stations is also stored in the memory of the WBSGS. Utilizing the information received from the wireless base stations 150 and the stored information, the WBSGS of the missile 110 processes and accurately determines the position of the missile 110. This information may ultimately be used to correct a trajectory of the missile 110, described further below. That is, an output control signal of the WBSGS may be coupled to the flying mechanisms of the missile 110 for making trajectory corrections.

As previously noted, the wireless base stations 150 may have different mobile service providers (MSP) and as such, may communicate via varied communication protocols and have varied carrier frequencies. The WBSGS of the present invention utilizes known methods for switching between the different communication protocols of the MSPs. For example, in one embodiment of the present invention, the WBSGS utilizes the methods described in U.S. Pat. No. 6,198,941, which is herein incorporated by reference in its entirety, for monitoring the environment in which a device is operating, to anticipate or predict a change or transition from one communication arrangement to the other. As described in U.S. Pat. No. 6,198,941, if the change is determined to be both imminent and significant, the operation change is effected substantially simultaneously, by changing parameters in the transport and/or application protocol layer in the device.

Table 1 below depicts several exemplary frequencies and frequency protocols capable of being received and processed by the WBSGS of the present invention.

TABLE 1

|  | Carrier Frequency | Guiding station |
| --- | --- | --- |
| GPS | 1262 MHz | Satellites |
| MSP1 GSM | 800 MHz | Base stations |
| MSP2 AMPS | 1800 MHz | Base stations |
| MSP3 CDMA | 1900 MHz | Base stations |
| Home RF LOS | As per FCC/local rules | Home RF station |
| Satellite Radio | As per FCC/local rules | Satellites radio |

Figure 2:
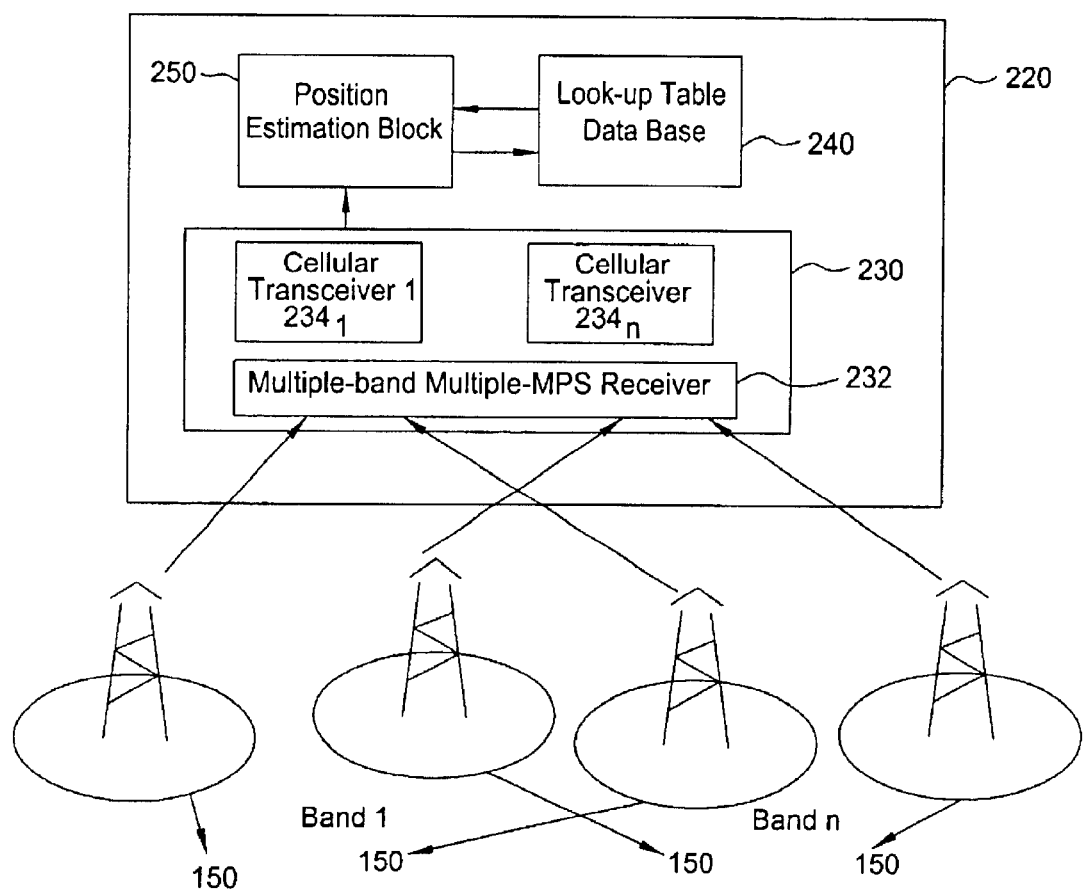
FIG. 2 depicts a high level block diagram of an embodiment of a wireless base station guidance system suitable for use in the operational environment of FIG. 1.

FIG. 2 depicts a high level block diagram of an embodiment of a WBSGS 220 in accordance with the present invention. The WBSGS 220 of FIG. 2 includes a transceiver 230, a memory (illustratively a look-up table data base) 240, and a processor (illustratively a position estimation block) 250. The transceiver 230 of the WBSGS 220 includes a multiple-band, multiple-MSP receiver 232, and a plurality of cellular transceivers $234_1$–$234_n$ (collectively cellular transceivers 234) for receiving and transmitting signals on different frequency bands, such as CDMA, GSM, etc.

The processor 250 of the WBSGS 220 cooperates with conventional support circuitry (not shown) such as power supplies, clock circuits, cache memory and the like as well as circuits that assist in executing software routines of the WBSGS 100. As such, it is contemplated that some of the process steps discussed herein as software processes may be implemented within hardware, for example, as circuitry that cooperates with the processor 250 to perform various steps. Although various control functions in accordance with the present invention are depicted as software routines, the control functions of the present invention can be implemented in hardware, for example, as an application specified integrated circuit (ASIC). As such, the process steps described herein are intended to be broadly interpreted as being equivalently performed by software, hardware, or a combination thereof.

The WBSGS 220 of the present invention processes signals received from wireless base stations 150 within its receiving range to calculate positioning information for the missile 110. More specifically, the multiple-band, multiple-MSP receiver 232 of the WBSGS 220 receives information, such as serving mobile base station ID (MBSID), neighboring MBSIDs, signal strengths of a serving and neighboring base stations, location area identifier (LAI), timing advance (TA), and the like from the surrounding wireless base stations 150. The multiple-band, multiple-MSP receiver 232 of the WBSGS 220 of the present invention may utilize any of several known methods known in the art for receiving and processing the signals from the various wireless base stations 150, such as the method described in U.S. Pat. No. 6,212,405 for extending a cell size or access range without incurring ASIC correlator re-design, which is herein incorporated by reference in its entirety.

The received information is communicated to the position estimation block 250. The information from the wireless base stations 150 is processed in the position estimation block 250 of the WBSGS 100. The position estimation block 250 compares the received information from the wireless base stations 150 to information regarding the wireless base stations 150, such as actual location and carrier frequency, stored in the look-up table data base 240, to identify the wireless base stations. The position estimation block 250 of the WBSGS 220 may then use any of a plurality of methods or techniques well known in the art for estimating the position of the missile 110 using the information from the received wireless base stations and the information stored in the look-up table data base 240, including information regarding the identified, received wireless base station(s) and any previously calculated position estimates or information.

For example, in one embodiment of the present invention, if information from three or more wireless base stations are received, the position estimation block 250 may use well known triangulation techniques for calculating the position of the missile 110. In instances where information from less than three wireless base stations are received, the position estimation block 250 may use a known starting position of the missile 110 stored in the memory 240, a known destination position for the missile 110 also stored in the memory 240, the information received from the wireless base stations and the stored information used to identify the received wireless base stations to calculate a current position of the missile.

It should be noted that in instances where the information from the wireless base stations is received by the WBSGS 220 via signals strong enough for the WBSGS 220 to determine at least the location of the transmitting wireless base stations, the position estimation block 250 may not need to compare the received information from the wireless base stations 150 to information stored in the look-up table data base 240. The WBSGS 220 may instead determine a position estimate by using the information from the received wireless base station without the need to search the look-up table data base 240 to identify a received wireless base station.

A positioning algorithm in the WBSGS 220 periodically estimates the position of the missile 110 and stores the estimated position in the memory 240 of the WBSGS 100, along with a history of previous estimates. As such, during a subsequent position estimation, the algorithm of the present invention may use a previously stored position estimate to assist in determining the present position of the missile 110.

Once a current position estimate is determined by the WBSGS 100, the current position estimate is used by the WBSGS 220 to calculate a vector between the determined current position and the missile's desired destination stored in the memory 240. This calculated vector is used for trajectory corrections for the missile 110. There may be more than one vector calculated by the WBSGS 220 due to the different MSPs and wireless base stations and their varied carrier frequencies. As such, the WBSGS 220 may utilize various methods for selecting which vector to use. For example in one embodiment of the present invention, the WBSGS 220 compares the error rates communicated within the information from the wireless base stations 150 and select the vector from the most reliable base station. In an alternate embodiment, the WBSGS 220 adds the respective vector calculations and uses an average trajectory correction for the missile 110. As mentioned above, a control signal representative of the calculated vector may then be coupled to the flying mechanisms of the missile 110 for making the trajectory corrections of the present invention.

During its flight, the WBSGS 220 of the missile 110 continuously accesses the information stored in the look-up table data base 240 to determine if the missile 110 is approaching any known wireless base stations. As such and as described above, when a signal (information) is received from a wireless base station 150 the wireless base station 150 is identified by comparing the information received from the wireless base station 150 to the information stored in the look-up table data base 240. This aspect of the present invention is particularly useful in instances when the WBSGS 220 receives a weak signal from a wireless base station 150 or in instances when the WBSGS 220 does not receive a signal from a wireless base station 150 that is known to be in the area.

That is, when the WBSGS 220 receives a weak signal from a wireless base station 150, the information received is compared to the stored information regarding the wireless base stations 150 that are known to be in the area of the missile's current position. As such, the wireless base station 150 is identified and the information regarding the wireless base station 150 is retrieved from the stored information in the look-up table data base 240, which is more reliable then information determined from a weak signal.

Referring back to FIG. 2, the WBSGS 220 of the present invention further includes a plurality of cellular transceivers 234. In one embodiment of the present invention, the plurality of cellular transceivers 234 of the WBSGS 220 are substantially cellular phones having various communication configurations similar to the wireless base stations 150, such as GSM, CDMA, and WCDMA, for communication with the wireless base stations 150. In one embodiment of the present invention, the cellular transceivers 234 include Subscriber Identification Module (SIM) cards, such as military secret SIM cards, for communication with the wireless base stations.

In instances where a wireless base station 150 is known to be in the area of the missile's current position but its information is not being received by the multiple-band, multiple-MSP receiver 232 of the WBSGS 100, the plurality of cellular transceivers 234 are used to communication with the expected wireless base stations 150. The plurality of cellular transceivers 234 are used to initiate the transmission of the expected information from the wireless base station 150 to the WBSGS 100.

For example, in one embodiment of the present invention, in the event of a power outage of a nearby wireless base station 150 (i.e., in cases of damage or sabotage of a wireless base station), a cellular transceiver 234 configured with the carrier frequency of the expected wireless base station is used to transmit a signal to activate an emergency backup battery of the non-transmitting nearby wireless base station such that the wireless base station is able to transmit its information signal to the multiple band receiver 232 of the WBSGS 220 for a period of time needed to capture the signal from the wireless base station. The period of time is determined by the WBSGS 100. When the signal from the wireless base station is received by the WBSGS 100, the backup battery of the wireless base station may again be turned off by a signal from the respective cellular transceiver 234 of the WBSGS 100. In an alternate embodiment of the present invention, the backup battery of the wireless base station turns off after the expiration of a timer. When the WBSGS 220 receives the transmitted information from the wireless base station(s) initiated by the cellular transceivers 234, WBSGS 220 determines the position of the missile 110 and makes any necessary trajectory corrections as described above.

This aspect of the present invention presupposes that at least some of the wireless base stations 150 are equipped with a logic device or software that is capable of being activated by a remote signal from the cellular transceivers 234 of the WBSGS 220 for allowing the activation of an alternate power source, such as a backup emergency battery, for performing the above described function of the present invention. For this purpose, at least the temporary wireless base stations set up for achieving the wireless guidance of the present invention may be configured with such capabilities to perform this aspect of the present invention. It is also possible that permanent wireless base stations will in the future also be required to implement such capabilities.

Figure 3:
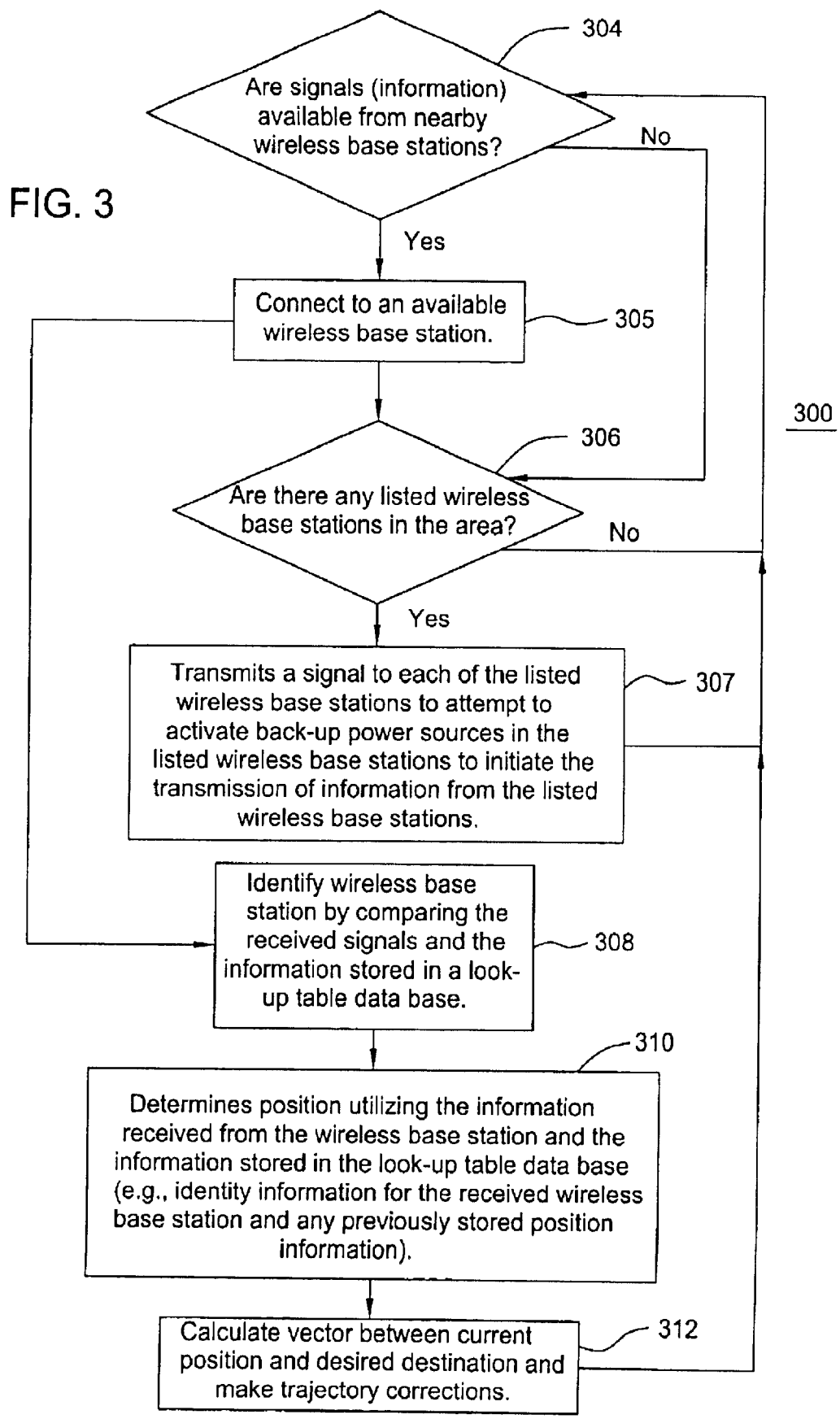
FIG. 3 depicts a flow diagram of an embodiment of a method of wireless base station guidance in accordance with the present invention.

FIG. 3 depicts a flow diagram of an embodiment of a method of wireless base station guidance in accordance with the present invention. The method 300 is entered at step 304.

At step 304, the method 300 determines if there are signals (information) available from nearby wireless base stations. If information is available, the method 300 proceeds to step 305. If no signals (information) are available from wireless base stations in the area, the method 300 proceeds to step 306.

At step 305, the method 300 connects to an available wireless base station. The method 300 then proceeds to step 308.

At step 306, the method 300 checks a look-up table data base to determine if any wireless base stations are located in the area of its current estimated position. If there are no wireless base stations listed in the look-up table data base, the method 300 returns to step 304 and continues to attempt to connect to an available wireless base station. If an available wireless base station is listed in the look-up table data base for its current position, the method 300 proceeds to step 307.

At step 307, the method 300 transmits a signal from at least one cellular transceiver to each of the listed wireless base stations to attempt to activate back-up power sources in the listed wireless base stations in the area to initiate the transmission of information from the listed wireless base stations. The method 300 then returns to step 304.

At step 308, the method 300 identifies the received wireless base station by comparing the received information to the information stored in the look-up table data base. The method 300 then proceeds to step 310.

At step 310, the method 300 determines its position utilizing the information received from the wireless base station and the information stored in the look-up table data base (e.g., identity information for the received wireless base station and any previously stored position information). The method 300 then proceeds to step 312.

At step 312, the method 300 calculates the vector between its determined current position and its destination, and makes trajectory corrections to its current trajectory if necessary. The method 300 then returns to step 304. The method 300 may continue until the missile reaches its target.

Figure 4A:
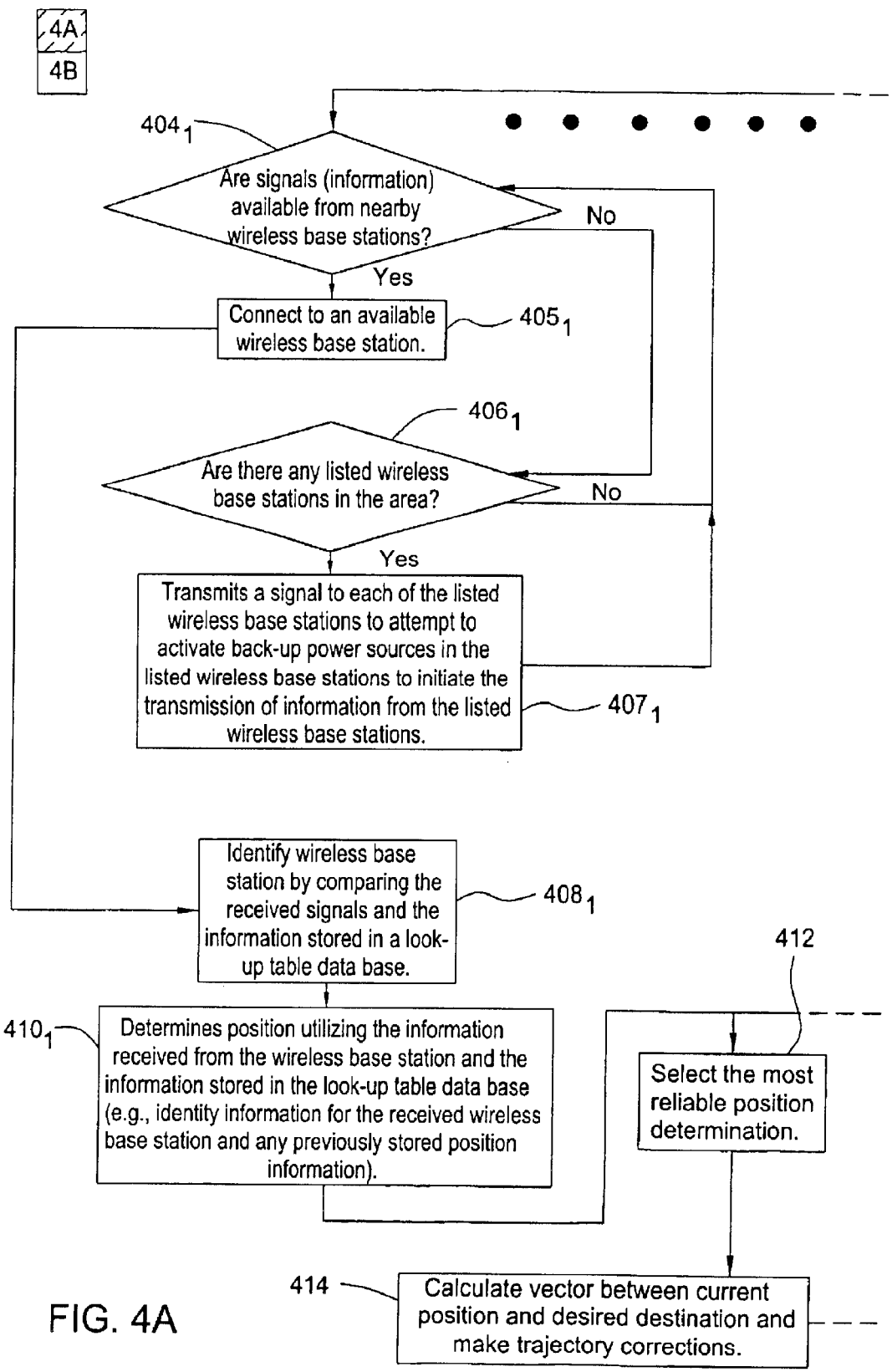
FIGS. 4A and 4B depict a flow diagram of an alternate embodiment of a method of wireless base station guidance in accordance with the present invention.
Figure 4B:
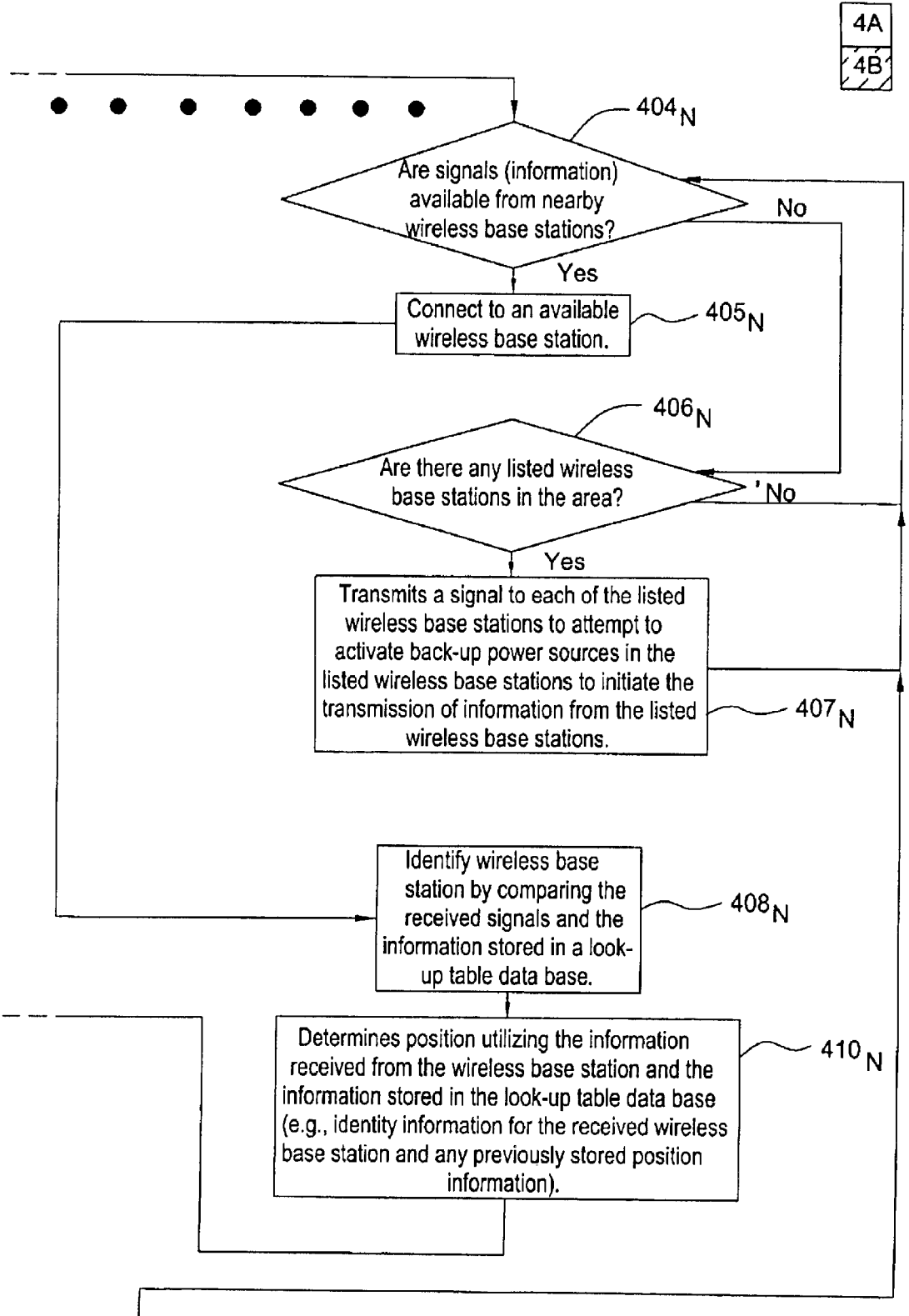

FIGS. 4A and 4B depict a flow diagram of an alternate embodiment of a method of wireless base station guidance in accordance with the present invention. The method 400 depicts a parallel implementation of the method of the present invention. The method 400 is entered at step 404.

At steps 404, the method 400 determines if there are signals (information) available from nearby wireless base stations in a service area of its current position. If information is available, the method 400 proceeds to step 405. If no signals (information) are available from wireless base stations in the area, the method 400 proceeds to step 406.

At steps 405, the method 400 connects to available respective wireless base stations in respective branches of step 405. The method 400 then proceeds to steps 408 of the respective branches. The use of information from multiple wireless base stations within the same region provides greater accuracy and faster position resolution in real-time through redundancy of information.

At steps 406, the method 400 checks a look-up table data base to determine if any wireless base stations are located in the area of its current estimated position. If there are no wireless base stations listed in the look-up table data base, the method 400 returns to steps 404 and continues to attempt to connect to available wireless base stations. If at least one available wireless base station is listed in the look-up table data base for its current position, the method 400 proceeds to steps 407.

At steps 407, the method 400 transmits a signal from at least one cellular transceiver to each of the listed wireless base stations to attempt to activate back-up power sources in the listed wireless base stations in the area to initiate the transmission of information from the listed wireless base stations. The method 400 then returns to steps 404.

At steps 408, the method 400 identifies the respective wireless base station for each branch by comparing the received information to the information stored in the look-up table data base. The method 400 then proceeds to the respective steps 410.

At steps 410, the method 400 determines its position in each of the parallel branches utilizing the information received from the respective wireless base stations and the information stored in the look-up table data base (e.g., identity information for the respective received wireless base stations and any previously stored position information). The method 400 then proceeds to step 412.

At step 412, the method 400 chooses the most reliable position determination as the position for the guidance system. The method 400 then proceed to step 414.

At step 414, the method 400 utilizes the most reliable position determination chosen in step 412 to calculate a vector between its determined current position and its destination, and makes trajectory corrections to its trajectory if necessary. The method 400 then returns to steps 404. The method 400 may continue until the missile reaches its target.

In alternate embodiments of the present invention, the WBSGS of the present invention is used as a secondary (backup) guidance device for a primary guidance system. For example, for systems using global positioning system (GPS) guidance as a means of primary guidance, the present invention provides a wireless means of guidance in the event of a GPS failure such as, GPS blackout, GPS blockage and poor GPS signal to noise ratio, to name a few. The present invention also provides for a method of accessing wireless base stations during a power outage. Although an embodiment of the present invention will be described within the context of a GPS guided flying device, it will be appreciated by those skilled in the art informed by the teachings of the present invention, that the present invention can be advantageously implemented in various other guided devices using various other guidance systems wherein it is desirable to provide a wireless means of guidance for devices in the event of a primary guidance system failure.

Figure 5:
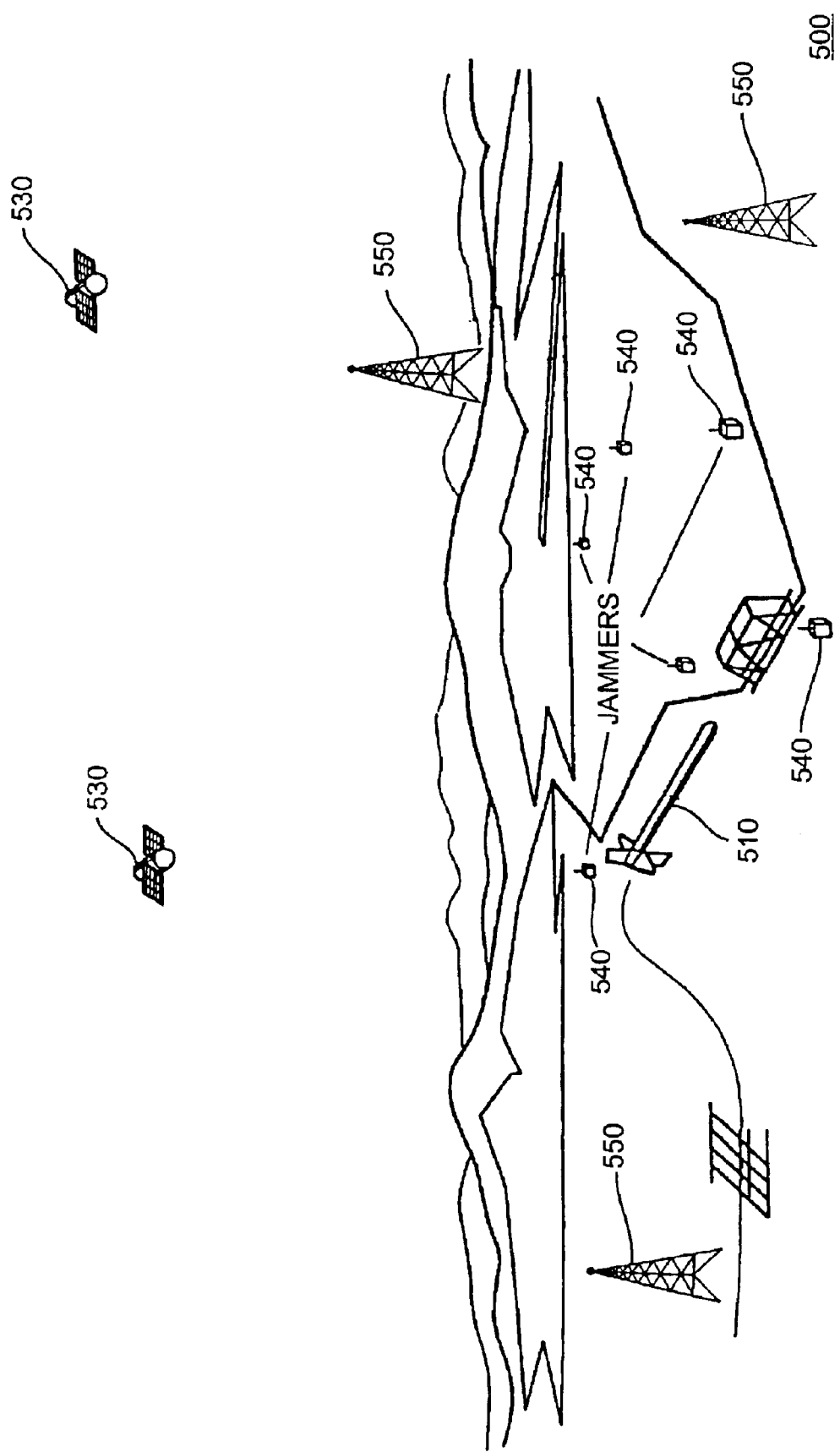
FIG. 5 depicts a high level block diagram of an embodiment of a wireless base station assisted GPS guidance system in accordance with the present invention in an operational environment.

FIG. 5 depicts a high level block diagram of an embodiment of a wireless base station assisted GPS guidance system in accordance with the present invention in an operational environment 500. The WBSGS assisted GPS guidance system of FIG. 5 is depicted by a GPS-guided missile 510, a target 520, a number of satellites 530, a number of jammers 540, and a number of wireless base stations 550. Conventionally, a missile 510 is guided to a target 50 using GPS signals from at least four satellites 530. Unfortunately, as mentioned above, a small number of low power (e.g. 1 watt), low cost jammers 540 may effectively defeat the system. In addition, other factors such as poor weather conditions and poor signal to noise ratio may cause the temporary or permanent blockage of GPS satellite signals. In any event, when the GPS link is lost, the missile 510 may drift considerably. Furthermore, in current systems when the GPS signal reception is restored, the GPS receiver needs substantial time to accurately estimate its position.

The present invention enhances GPS-based positioning by using the wireless-based positioning of the present invention described above with regard to the WBSGS of the present invention. For example in FIG. 5, a GPS receiver in the missile 510 is adapted with a WBSGS to receive information from the wireless base stations 150. As described above, the information received from the wireless base stations 150 may include such information as the location of the wireless base station, the direction of the received signal, the time the signal traveled to reach the receiver, and the like. In addition, the wireless base stations 150 may transmit using any carrier frequency, such as CDMA and GSM, and still be received by the WBSGS of the present invention.

As described above, in addition to the information received from the permanent base stations, the WBSGS of the present invention may receive information from temporary wireless base stations having known locations, frequencies and communications protocols.

Figure 6:
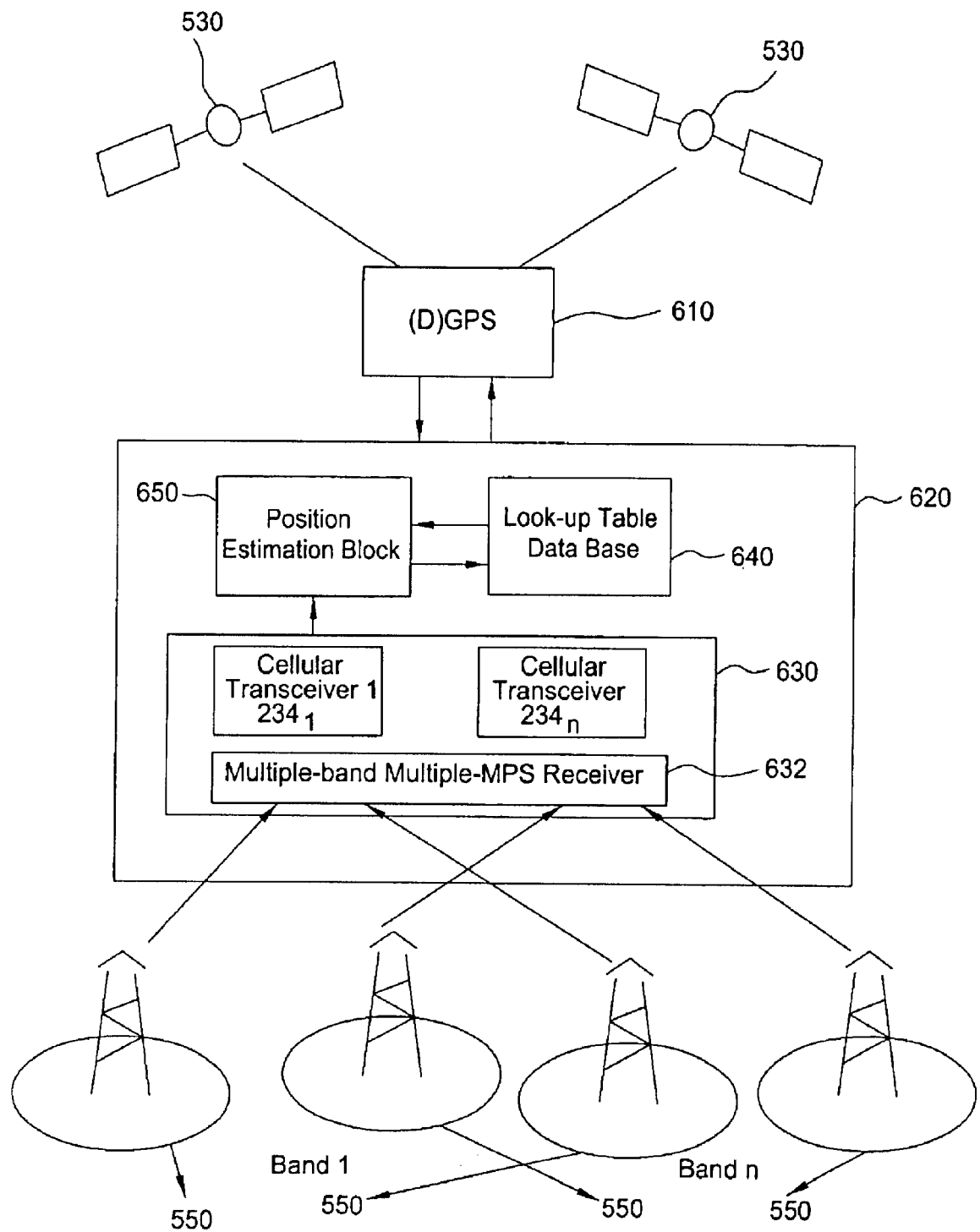
FIG. 6 depicts a high level block diagram of an embodiment of a GPS receiver adapted with a wireless base station guidance system in accordance with the present invention.

FIG. 6 depicts a high level block diagram of an embodiment of a GPS receiver adapted with a WBSGS 620 in accordance with the present invention. The GPS receiver 610 of FIG. 6 is substantially a conventional GPS receiver. The GPS receiver 610 receives information from the satellites 530 for guiding the missile 510 to its target 520. In addition to the information from the satellites 530, the GPS receiver 610 is adapted to receive information from the WBSGS 511. The WBSGS 620 of FIG. 6 includes a transceiver 630, a memory (illustratively a look-up table data base) 640, and a processor (illustratively a position estimation block) 650. The transceiver 630 of the WBSGS 620 includes a multiple-band, multiple-MSP receiver 632, and a plurality of cellular transceivers $634_1$–$634_n$ (collectively cellular transceivers 634) for receiving and transmitting signals on different frequency bands, such as CDMA, GSM, etc.

During times when GPS guidance information (GPS signals) is available from the satellites 530, the GPS receiver 610 of the present invention operates substantially as a conventional GPS receiver. That is, once the GPS receiver 610 is started, it is driven through an initialization procedure that includes the sensing of all available satellites in the sky. Several iterations of the initialization procedures are performed to secure an accurate position estimation. This initialization procedure is also performed when the GPS receiver 610 recovers the GPS signals from the available satellites after of period of GPS failure in which the reception of the satellite signals was disabled or interrupted.

In the event of a GPS failure, such as GPS blackout, GPS blockage or poor GPS signal to noise ratio, the WBSGS 620 of the present invention processes signals from the wireless base stations 550 to provide positioning information for the GPS receiver 610. More specifically, during periods of GPS failure, the WBSGS 620 operates substantially the same as the WBSGS 220 of FIG. 1 described above.

For example, the received information is communicated to the position estimation block 650. The information from the wireless base stations 550 is processed in the position estimation block 650 of the WBSGS 511. The position estimation block 650 compares the received information from the wireless base stations 550 to information regarding the wireless base stations 550, such as actual location and carrier frequency stored in the look-up table data base 640, to identify the wireless base stations. The position estimation block 650 of the WBSGS 620 then uses any of a plurality of methods or techniques well known in the art for estimating the position of the missile 510 using the information from the received wireless base stations and the information stored in the look-up table data base 640, including information regarding the identified, received wireless base station(s) and any previously known position estimates or information.

In alternate embodiments of the present invention, the WBSGS 620 continuously receives information from surrounding wireless base stations and determines an estimated position of the missile 510. The estimated position determined by the WBSGS 620 is communicated to the GPS receiver 610 to provide redundant position information for the GPS receiver. This information may be used for checking the accuracy of either the GPS receiver 610 or the WBSGS 511. As such, corrections may be made to the position determinations of the GPS receiver 610 or the WBSGS 511.

In one embodiment of the present invention, the position estimation block 650 also receives a last known position estimate from the GPS receiver 610 during a GPS failure. As such, the position estimation block 650 uses the information received from the wireless base stations 550, along with the information stored in the look-up table data base 640 for the identified wireless base station(s) and the last known position estimate from the GPS receiver 610, for estimating the current position of the missile 510.

In an alternate embodiment of the present invention, current position information estimated by the GPS receiver 610 is continuously communicated to the WBSGS 620 during normal GPS operation. As such during a GPS failure, a last known position estimate for the missile 510 is already known by the WBSGS 511. As such, if during a GPS failure information from the GPS receiver 610 is unavailable, the WBSGS 620 is still capable of using the last known position of the missile 510 determined by the GPS receiver 610 along with the information received from the wireless base stations 550 and the information stored in the look-up table data base 640 for the identified wireless base station(s) to determine a new, current position estimate for the missile 510.

In yet another embodiment of the present invention, information regarding the starting position of the missile 510, the trajectory of the missile 510, the speed of the missile 510, and the like is known by the WBSGS 620 of the present invention. As such, during a GPS failure the WBSGS 620 utilizes the known missile information, the information received from the wireless base stations 550 and the stored information regarding the identified wireless base station(s) 550 to determine a position estimate for the missile 510 without any need for information from the GPS receiver 610.

As described above with reference to the WBSGS 220 of FIG. 1, a positioning algorithm in the WBSGS 620 periodically estimates the position of the missile 510 and stores the estimated position in the memory 640, along with a history of previous estimates. As such, during a subsequent position estimation, the algorithm of the present invention may use a previously stored position estimate to assist in determining the present position of the missile 510.

Furthermore, the latest stored position estimate determined by the WBSGS 620 is communicated to the GPS receiver 610 when the satellite signals once again become available (the end of the GPS failure). The last position estimate determined by the WBSGS 620 and communicated to the GPS receiver 610 is used to reduce the time it takes to "warm start" the GPS receiver 610 (i.e., reduce the time it takes for the GPS receiver to determine its position).

Once a current position estimate is determined by the WBSGS 511, the current position estimate may be used by the WBSGS 620 to calculate a vector between the determined current position and the missile's destination. This calculated vector is used for trajectory corrections for the missile 510. As described above, there may be more than one vector calculated by the WBSGS 620 due to the different MSPs and wireless base stations and their varied carrier frequencies. As such, the WBSGS 620 may again utilize various methods for selecting which vector to use.

Figure 7:
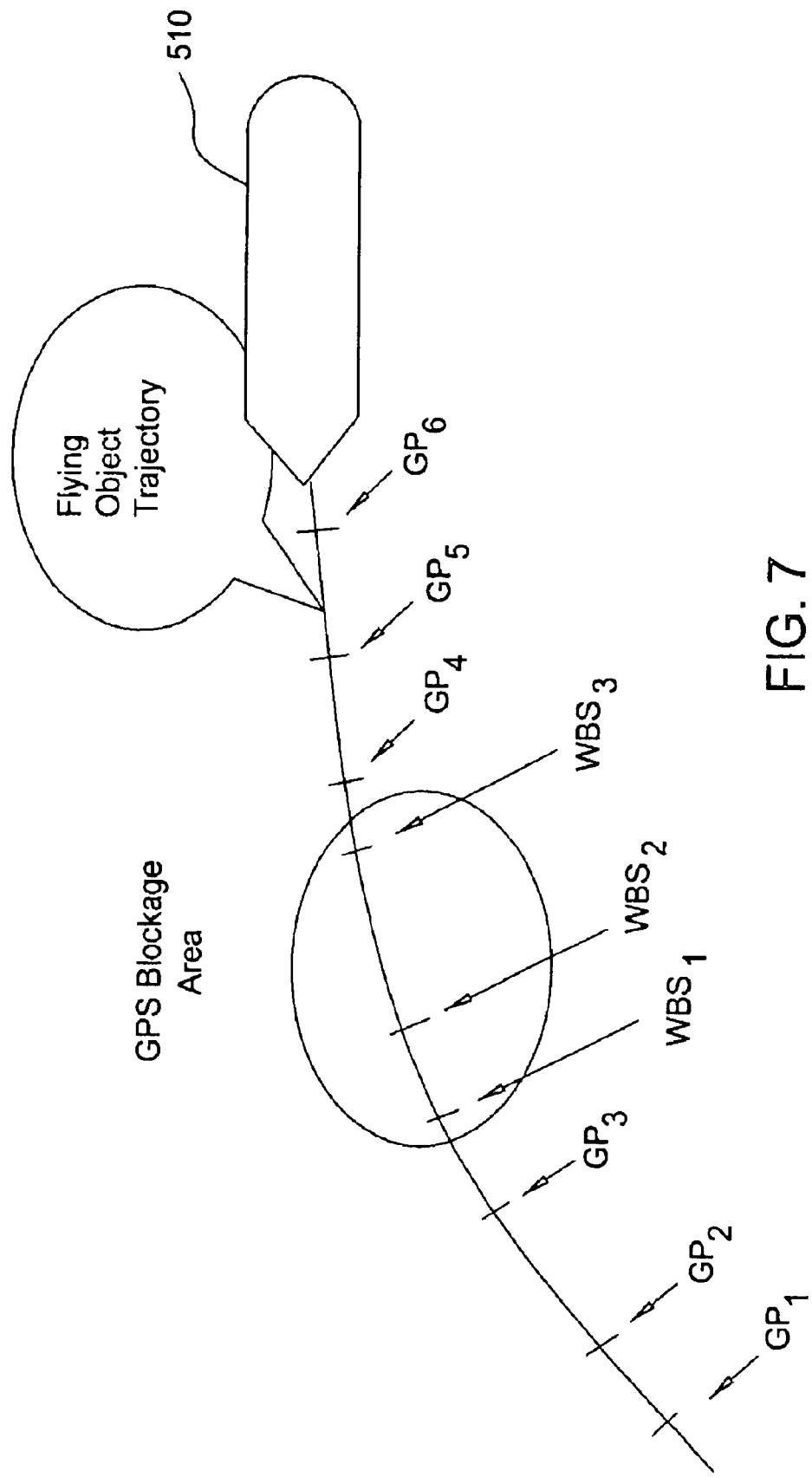
FIG. 7 depicts an exemplary trajectory of a missile and its guidance in accordance with the concepts of the present invention.

FIG. 7 depicts an exemplary trajectory of a missile 510 and the guidance of the missile 510 in accordance with the concepts of the present invention. The missile 510 of FIG. 7 is initially positioned by a GPS receiver using information from satellites. The GPS location of the missile is depicted in FIG. 7 as positions $GP_1$, $GP_2$, and $GP_3$. Within a GPS blockage area (GPS failure), the trajectory of the missile is controlled in accordance with the present invention by a WBSGS in the missile using information from wireless base stations. The WBSGS of the missile receives information from a first wireless base station $WBS_1$, then a second wireless base station $WBS_2$ and subsequently a third wireless base station $WBS_3$. The WBSGS of the present invention uses conventional techniques known in the art for crossing boundaries when switching from one serving wireless base station to the next. When the missile progresses out of the GPS blockage area, the information regarding the missile's last location determined by the WBSGS is communicated to the GPS receiver and the missile is once again positioned by the GPS receiver using information received from the satellites. The subsequent GPS location of the missile is depicted in FIG. 7 as positions $GP_4$, $GP_5$, and $GP_6$.

As described above, during its flight, the WBSGS 620 continuously accesses the information stored in the look-up table data base 640 to determine if the missile 510 is approaching any known wireless base stations. As such and as described above, when a signal (information) is received from a wireless base station 550 the wireless base station 550 is identified by comparing the information received from the wireless base station 550 to the information stored in the look-up table data base 640.

Referring back to FIG. 7, the WBSGS 620 of the present invention also includes a plurality of cellular transceivers 634. The plurality of cellular transceivers 634 are, as before, substantially cellular phones having various communication configurations similar to the wireless base stations 550, such as GSM, CDMA, and WCDMA, for communication with the wireless base stations 550. In one embodiment of the present invention, the cellular transceivers 634 include Subscriber Identification Module (SIM) cards, such as military secret SIM cards, for communication with the wireless base stations.

In instances where a wireless base station 550 is known to be in the area of the missile's current position but its information is not being received by the multiple-band, multiple-MSP receiver 632 of the WBSGS 511, the plurality-of cellular transceivers 634 are used to communication with the expected wireless base stations 550. The plurality of cellular transceivers 634 are used to initiate the transmission of the expected information from the wireless base station 550 to the WBSGS 620 as described in the previous embodiment above. When the WTBSGS 620 receives the transmitted information from the wireless base station(s) initiated by the cellular transceivers 634, WBSGS 620 determines the position of the missile 510 and makes any necessary trajectory corrections as described above.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for guidance of a device, comprising:
   receiving signals from at least one wireless base station indicating at least a respective position thereof;
   determining the current position of said device using said received signals;
   calculating a vector between the determined current position and a predetermined desired destination for said device; and
   using said calculated vector to make any required trajectory corrections to said device's current trajectory for guiding said device to the desired destination.

2. The method of claim 1, further comprising:
   comparing the received signals from said at least one wireless base station to stored information regarding known wireless base stations to determine the identity and location of said at least one wireless base station to assist in determining the current position of said device.

3. The method of claim 1 wherein said method is utilized as a backup guidance system and is implemented for the guidance of said device only after a failure of a primary guidance system.

4. The method of claim 3, wherein said method is utilized as a backup guidance system for a GPS guidance system.

5. The method of claim 3, wherein said device's current position determined by said method is utilized as an initial position estimate for a primary guidance system when the primary guidance system is again operational after a failure.

6. The method of claim 3, wherein said method utilizes a last position estimate determined by a primary guidance system before a failure for determining the current position of said device after a failure of the primary guidance system.

7. The method of claim 1, wherein said at least one wireless base station comprises more than one wireless base station and wherein signals from said more than one wireless base stations are received substantially in parallel.

8. The method of claim 1, wherein said at least one wireless base station comprises more than one wireless base station and wherein signals from said more than one wireless base station are processed substantially in parallel.

9. The method of claim 1, wherein said at least one wireless base station comprises more than one wireless base station and wherein signals from said more than one wireless base station are received and processed substantially in parallel.

10. The method of claim 1, further comprising communicating with said at least one wireless base station to initiate the transmission of signals from said at least one wireless base station.

11. The method of claim 10, wherein the transmission of information from said at least one wireless base station is initiated by activating an alternate source of power for said at least one wireless base station in the event of an outage of primary power source power for said wireless base station.

12. The method of claim 1, wherein said at least one wireless base station comprises a plurality of wireless base stations employing different carrier frequencies.

13. A wireless base station guidance system for a device, comprising:
   a receiver, for receiving signals from wireless base stations; and
   a processor for determining the current position of said device utilizing the signals received by said receiver and information stored in a memory, and for calculating a vector between the determined position and a desired destination for said device, wherein said calculated vector is used to make trajectory corrections to said device's current trajectory for guiding said device to the desired destination.

14. The wireless base station guidance system of claim 13, further comprising at least one wireless transceiver adapted to communicate with a respective one of said wireless base stations.

15. The wireless base station guidance system of claim 14, wherein said at least one wireless transceiver is used to activate an alternate power source of the respective wireless base station to initiate the transmission of information from said respective wireless base station in the event of an outage of primary power source power for said wireless base station.

16. The wireless base station guidance system of claim 13, wherein said wireless base stations comprise at least one temporary base station.

17. The wireless base station guidance system of claim 13, wherein said receiver is adapted to receive signals from wireless base stations employing different carrier frequencies.

18. The wireless base station guidance system of claim 13, wherein the information stored in said memory comprises information regarding at least one of the set consisting of the location, communication protocols and operating frequencies of known wireless base stations, wherein said information is used to identify said wireless base stations from which signals are received.

19. The wireless base station guidance system of claim 13, wherein said wireless base station guidance system is utilized as a backup guidance system and determines the current position of said device only after a failure of a primary guidance system.

20. The wireless base station guidance system of claim 19, wherein said wireless base station guidance system is utilized as a backup guidance system for a GPS guidance system.

21. The guidance system of claim 20, wherein a last position estimate determined by a primary GPS guidance system before a failure, is communicated to said wireless base station guidance system to be used in determining a current position for said device after a failure of the GPS guidance system.

22. A guidance system for a device, comprising:

means for receiving signals from multiple wireless base stations; and means for determining the current position of said device utilizing the received signals and stored information, and for calculating a vector between the determined position and a desired destination for said device, wherein said calculated vector is used to make trajectory corrections to said device's current trajectory for guiding said device to the desired destination.

23. The guidance system of claim 22, further comprising means for communicating with a respective one of said multiple wireless base stations.

24. The guidance system of claim 23, wherein said means for communicating is used to activate an alternate power source of the respective wireless base station to initiate the transmission of information from said respective wireless base station in the event of an outage of primary power source power for said wireless base station.

* * * * *